(12) United States Patent
Satake et al.

(10) Patent No.: US 10,676,049 B2
(45) Date of Patent: Jun. 9, 2020

(54) ELECTRICAL WIRING DEVICE FOR VEHICLE

(71) Applicant: YAZAKI CORPORATION, Tokyo (JP)

(72) Inventors: Shuuji Satake, Shizuoka (JP); Masato Kakehi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 229 days.

(21) Appl. No.: 15/177,717

(22) Filed: Jun. 9, 2016

(65) Prior Publication Data

US 2016/0288742 A1 Oct. 6, 2016

Related U.S. Application Data

(63) Continuation of application No. PCT/JP2014/083723, filed on Dec. 19, 2014.

(30) Foreign Application Priority Data

Jan. 9, 2014 (JP) ................................. 2014-002237

(51) Int. Cl.
*H02H 9/08* (2006.01)
*B60R 16/023* (2006.01)
(Continued)

(52) U.S. Cl.
CPC ........ *B60R 16/0238* (2013.01); *B60R 16/033* (2013.01); *H02H 3/085* (2013.01); *H02H 7/222* (2013.01)

(58) Field of Classification Search
CPC .. B60R 16/0238; B60R 16/033; H02H 3/085; H02H 7/222
(Continued)

(56) References Cited

U.S. PATENT DOCUMENTS

| 5,894,394 A | * | 4/1999 | Baba ...................... H02H 1/043 |
| | | | 361/100 |
| 6,359,443 B1 | * | 3/2002 | Endo ...................... B60N 2/002 |
| | | | 324/503 |

(Continued)

FOREIGN PATENT DOCUMENTS

| CN | 201000339 Y | 1/2008 |
| EP | 1968246 A1 | 9/2008 |

(Continued)

OTHER PUBLICATIONS

An office action dated Oct. 10, 2017 in a counterpart Chinese patent application.

(Continued)

*Primary Examiner* — Thienvu V Tran
*Assistant Examiner* — Lucy M Thomas
(74) *Attorney, Agent, or Firm* — Metrolex IP Law Group, PLLC

(57) ABSTRACT

An electrical wiring device for vehicle includes a distribution module that is disposed between an auxiliary connector and optional devices. The distribution module includes: semiconductor relays connected to a power supply line; input/output interfaces; a control unit configured to control the semiconductor relays and the input/output interfaces on the basis of various kinds of signals acquired via a communication line; and a connecting terminal for connecting outputs of the semiconductor relays and outputs of the input/output interfaces to the optional devices. The control unit controls operations of the semiconductor relays and the input/output interfaces corresponding to the optional devices connected to the connecting terminal.

9 Claims, 3 Drawing Sheets

(51) Int. Cl.
*B60R 16/033* (2006.01)
*H02H 3/08* (2006.01)
*H02H 7/22* (2006.01)

(58) Field of Classification Search
USPC .................................................. 361/93.8
See application file for complete search history.

(56) References Cited

U.S. PATENT DOCUMENTS

| | | | | |
|---|---|---|---|---|
| 8,330,374 | B2* | 12/2012 | Tanaka | B60Q 1/0094 |
| | | | | 315/77 |
| 8,437,110 | B2* | 5/2013 | Nakamura | H02H 6/00 |
| | | | | 361/101 |
| 8,570,700 | B2* | 10/2013 | Maruyama | H02H 6/005 |
| | | | | 361/101 |
| 2003/0098211 | A1* | 5/2003 | Saito | B60G 17/0185 |
| | | | | 191/3 |
| 2006/0276947 | A1 | 12/2006 | Kaita et al. | |
| 2007/0049086 | A1 | 3/2007 | Sakane | |
| 2014/0103715 | A1 | 4/2014 | Ito et al. | |
| 2015/0340855 | A1* | 11/2015 | Nagahama | H02H 3/085 |
| | | | | 361/87 |

FOREIGN PATENT DOCUMENTS

| | | |
|---|---|---|
| JP | H04-286435 A | 10/1992 |
| JP | 2003-252131 A | 9/2003 |
| JP | 2007-062480 A | 3/2007 |
| JP | 2007-253742 A | 10/2007 |
| JP | 2009-290409 A | 12/2009 |
| JP | 5107608 B2 | 12/2012 |
| JP | 2013-10462 A | 1/2013 |

OTHER PUBLICATIONS

The Official Action dated Apr. 27, 2017 in the counterpart Chinese patent application.

* cited by examiner

ELECTRICAL WIRING DEVICE FOR VEHICLE

CROSS REFERENCE TO RELATED APPLICATIONS

This application is a continuation of International Application No. PCT/JP2014/083723, filed Dec. 19, 2014, and based upon and claims the benefit of priority from Japanese Patent Application No. 2014-002237, filed Jan. 9, 2014, the entire contents of all of which are incorporated herein by reference.

TECHNICAL FIELD

The present application relates to an electrical wiring device for vehicle, which is installed in a vehicle to connect with optional devices mounted on the vehicle.

BACKGROUND ART

Each of various kinds of electrical devices mounted on a vehicle is connected to a wire harness for transmitting signals outputted from a power supply, a ground, an ECU, and the like, through a connector. Additionally, there is also required, as an electrical wiring device for the vehicle, auxiliary connectors for connection with optional devices, such as a navigation device (sec PTL 1 (JP 2003-252131 A)).

FIG. 3 is an explanatory view illustrating auxiliary connectors as the electrical wiring device for the vehicle according to the conventional example and various kinds of optional devices for connection with the auxiliary connectors. The example illustrated in FIG. 3 illustrates the electrical wiring device 100 for the vehicle, which is intended to connect with four optional devices N1-N4. The electrical wiring device 100 of the conventional example includes wire harnesses 102 for connection with the respective optional devices N1-N4 and auxiliary connectors 101 for connection with the respective wire harnesses.

The optional device N1 requires, besides signals of power supply (+B) and ground (GND), and also respective signals of ignition (IG), accessories (ACC), illuminations (ILL), speed (SPD), and backward travelling (R). Thus, there is a need for a wire harness for connection with these seven signals and also the number of connectors corresponding to the wire harness. That is, a plurality of connectors for power supply and signal supply are used in accordance with the optional devices to be mounted on the vehicle.

Meanwhile, the optional device N2 requires a wire harness for connection with three signals since it requires signals of power supply (+B), ground (GND), and ignition (IGN). Also, there is a need for the number of connectors corresponding to the wire harness.

SUMMARY

In the electrical wiring device 110 for vehicle of the conventional example, there arise problems represented by the following remarks (1) to (4).

(1) As the optional devices N1-N4 use different powers and signals with respect to each device, the size of power lines for connection with the optional devices N1-N4 may differ from the size of a power line on the power-supply side and therefore, there is a need to provide a distribution section with an additional fuse for protecting the power line.

(2) When associating the operations of the optional devices N1-N4 with such as condition of the vehicle with use of various kinds of in-vehicle data, only predetermined signal data is available while the other signal data is not available and therefore, the device is inferior in its versatility and extensibility.

(3) If the optional devices N1-N4 are connected to a communication line on the side of the existing vehicle system, no communication line could be set. In such a case, there arises a standstill of the vehicle system.

(4) The connectors are installed on the assumption of the optional devices N1-N4 to be mounted. Therefore, if it is required to installing an unexpected optional device, such as a drive recorder, there is a need of providing a branch point obtained by processing a wire harness, thereby causing the connecting workability to be worsened.

Therefore, an object of the present application is to provide an electrical wiring device for vehicle, which allows the connecting of optional devices to be performed with a simple operation.

An electrical wiring device for vehicle according to an aspect of the present application includes an auxiliary connector to which a power supply line, a ground line, and a communication line for an in-vehicle network all mounted on a vehicle are connected and a distribution module disposed between optional devices mounted on the vehicle and the auxiliary connector. The distribution module includes one or more relays connected to the power supply line, one or more input/output interfaces, a control unit configured to control the relays and the input/output interfaces on the basis of various kinds of signals acquired via the communication line, a connecting terminal for connecting outputs of the relays and outputs of the input/output interfaces to the optional devices, and a fuse function for detecting an overcurrent on the basis of an electricity energizing current and an electricity energizing time of each of the relays. The control unit is configured to control operations of the relays and the input/output interfaces corresponding to the optional devices connected to the connecting terminal.

Since the auxiliary connector is installed in the vehicle and connected to the optional devices through the intermediary of the distribution module, all the vehicle has to do is only to mount the auxiliary connector for connecting with the power supply line, the ground line, and the communication line normally. For this reason, it is possible to simplify the components to be mounted on the vehicle. Additionally, as it is performed to select a distribution module corresponding to the optional devices to be connected and connect the selected distribution module to the auxiliary connector, it becomes possible to perform the connecting operation of the optional devices extremely easily.

The control unit may be configured to switch ON and OFF of each of the relays corresponding to vehicular signals acquired via the communication line.

By switching ON and OFF of each of the relays corresponding to the vehicular signals, it is possible to accomplish power supply that respective optional devices require.

The distribution module may include a voltage converter for converting a voltage supplied from the power supply line.

Since the distribution module includes the voltage converter, it is possible to supply an optional device requiring a voltage different from a battery voltage with an electrical power by a simple operation.

DESCRIPTION OF EMBODIMENTS

Figure 1:
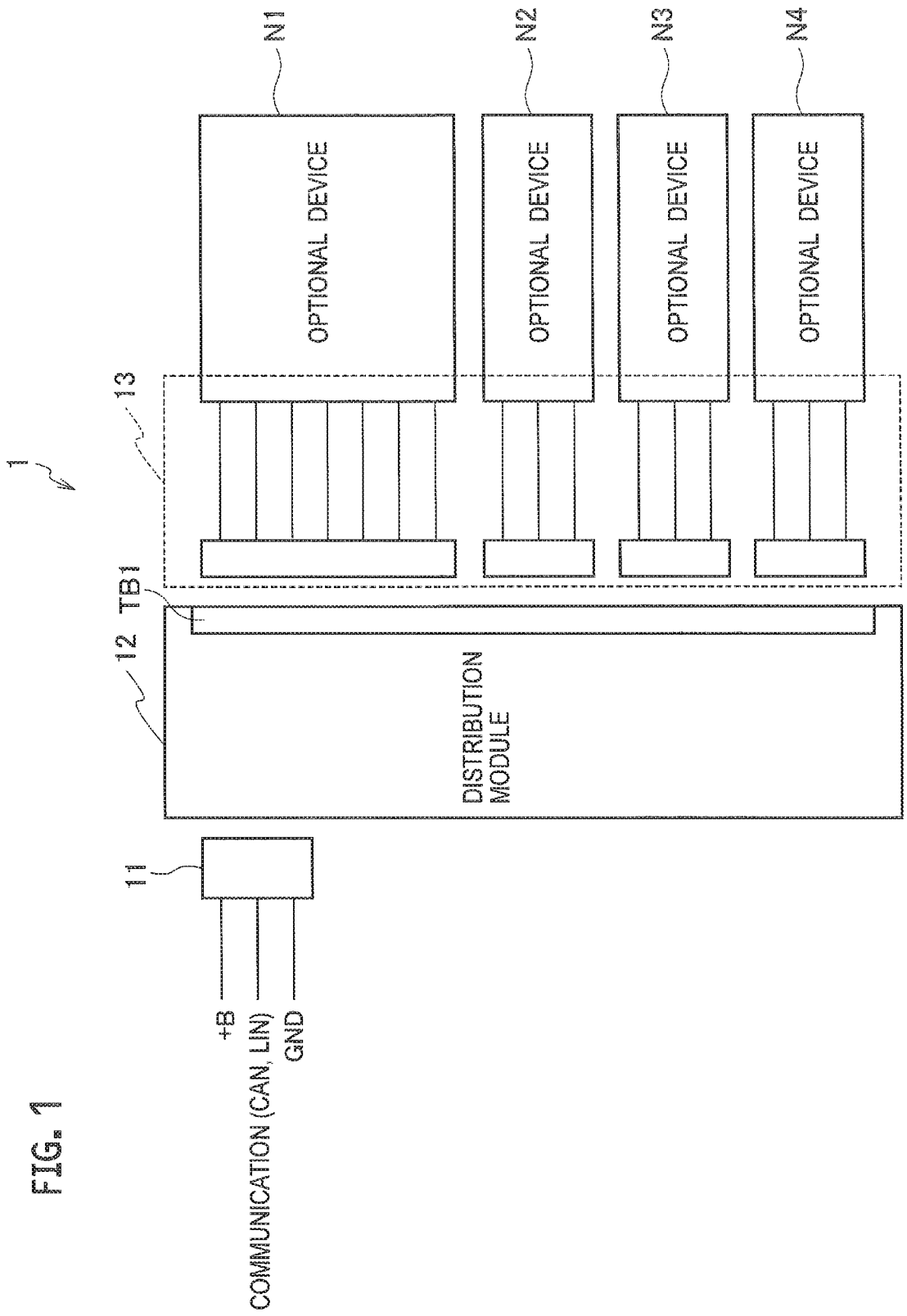
FIG. 1 is a wiring diagram illustrating the constitution of an electrical wiring device for vehicle according to an embodiment.

An embodiment will be described with reference to drawings below. As illustrated in FIG. 1, a wiring device 1 for vehicle according to the embodiment includes an auxiliary connector 11 and a distribution module 12, and connects with various kinds of optional devices N1-N4 through the distribution module 12. The distribution module 12 includes a connecting terminal TB1 for connection with the respective optional devices N1-N4. The connecting terminal TB1 is connected to the optional devices N1-N4 via wire harnesses 13.

A power supply line (+B) connected to a vehicle battery, a ground line (GND), and a communication line, such as CAN (Controller Area Network) and LIN (Local Interconnect Network), are connected to the auxiliary connector 11. In connection, a vehicle body may be used for the power supply line and the ground line.

Figure 2:
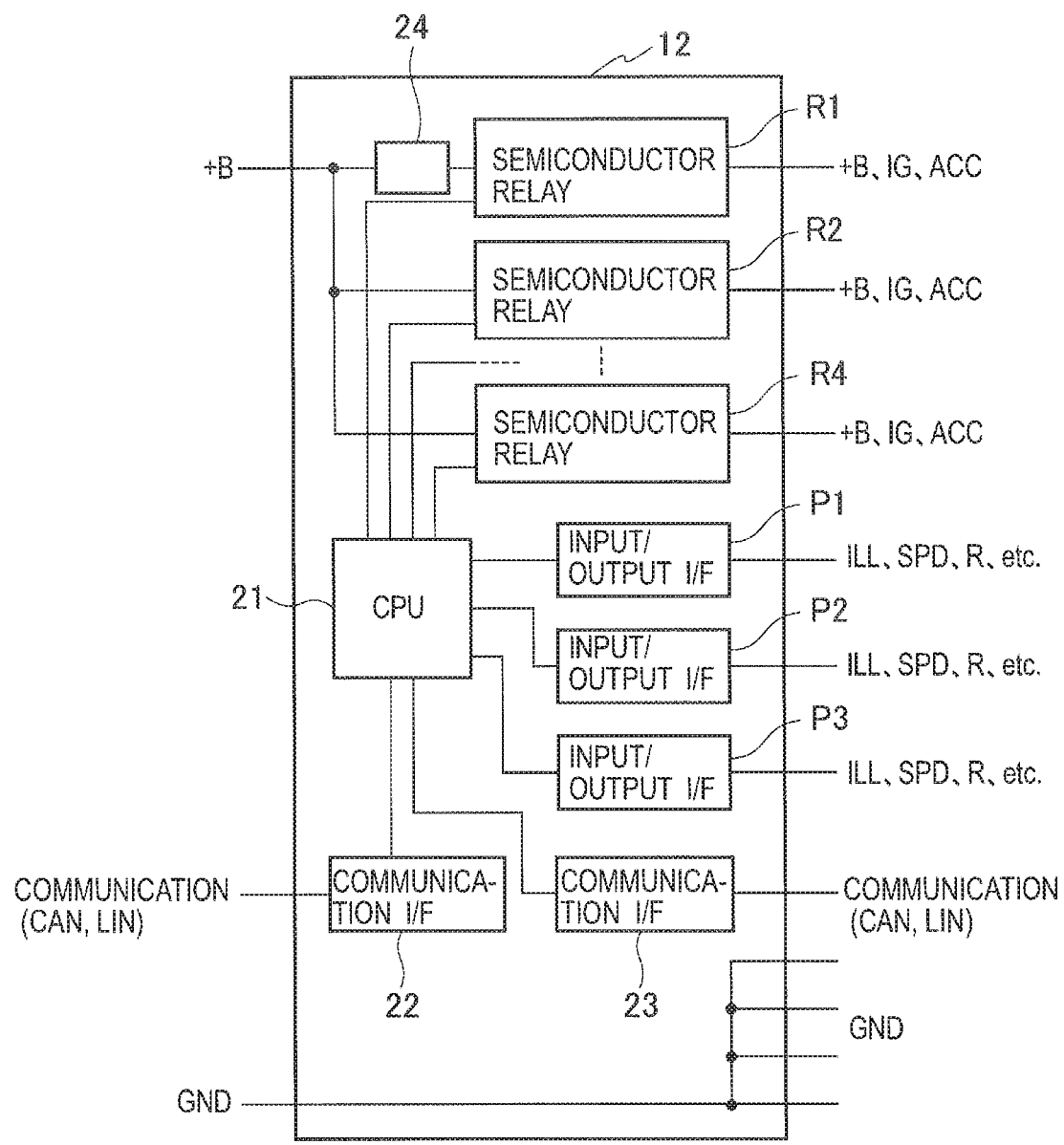
FIG. 2 is a block diagram illustrating the detailed constitution of a distribution module of the electrical wiring device for vehicle according to the embodiment.
Figure 3:
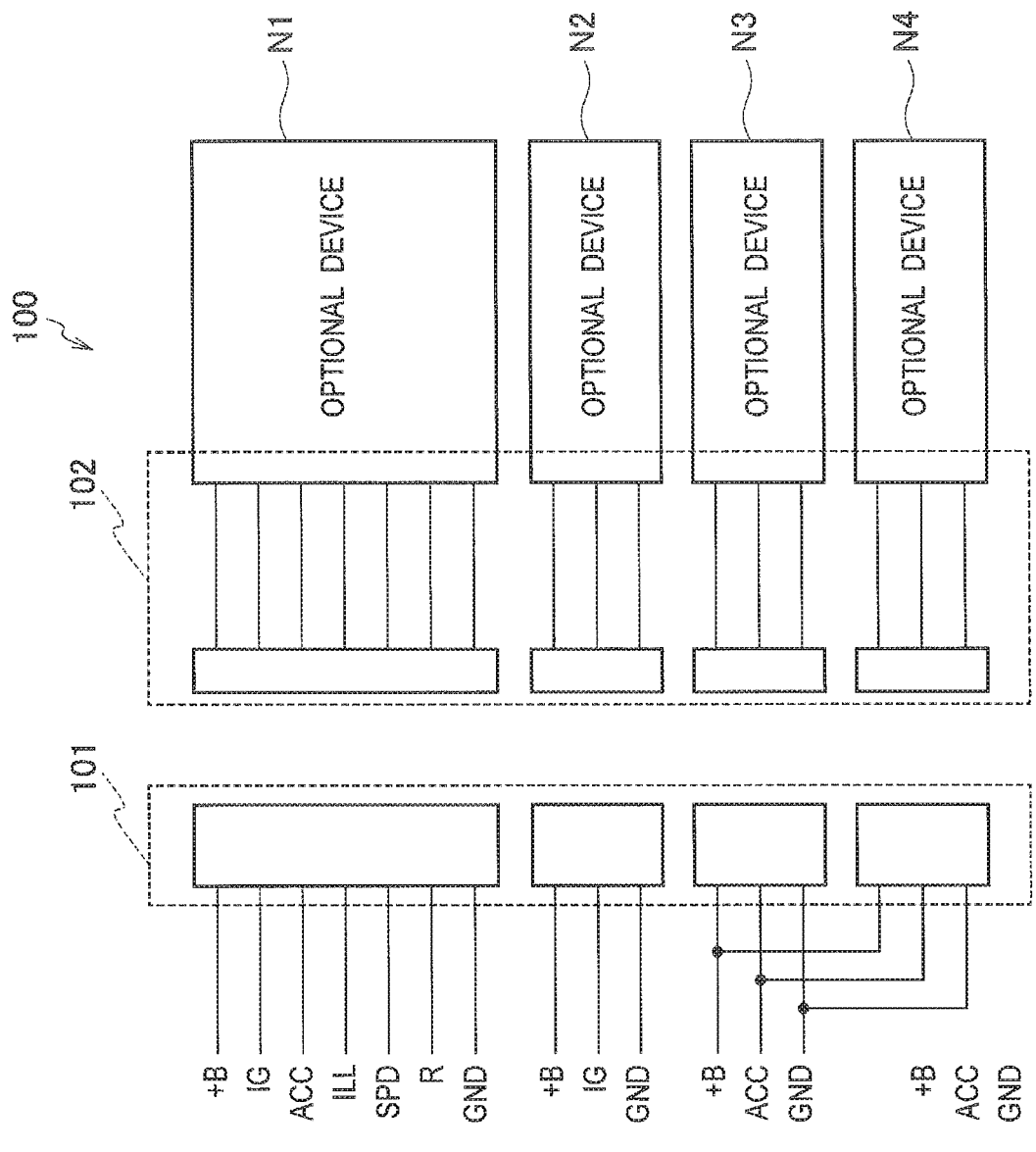
FIG. 3 is a wiring diagram illustrating the constitution of an electrical wiring device for vehicle of a conventional example.

Next, the detailed constitution of the distribution module 12 will be described with reference to FIG. 2. As illustrated in FIG. 2, the distribution module 12 has the power supply line (+B), the ground line (GND), and the communication line, all connected to the auxiliary connector 11. The communication line transmits various kinds of signals (detection signal or control signal) via an in-vehicle network, such as CAN and LIN. The power supply line (+B) transmits electrical power generated from a vehicle battery of, for example, DC 12V.

The distribution module 12 includes a plurality of semiconductor relays R1-R4 and a control unit 21 all provided to execute a control for outputting the electrical power supplied via the power supply line (+B) to various kinds of optional devices N1-N4 arranged on the subsequent stage-side. Although a semiconductor relay is adopted as one example of relay in the embodiment, a relay other than the semiconductor relay may be used alternatively.

The distribution module 12 further includes a communication interface 22 connected to the communication line to communicate various kinds of signals, input/output interfaces P1-P3 for executing a control to output various kinds of signals acquired via the communication interface 22 and the control signal to three of the optional devices N1-N4, and a communication interface 23 for executing a network communication, such as CAN or LIN, with the optional devices N1-N4.

Each of the semiconductor relays R1-R4 is provided with a fuse function. In detail, each of the semiconductor relays R1-R4 has a function of: calculating a heat generation temperature and a heat radiation temperature of the semiconductor relay on the basis of a current value (conduction current) flowing through the semiconductor relay and an electricity energizing time; estimating a temperature of the semiconductor relay based on an ambient temperature; judging an overcurrent (detecting an overcurrent) if the estimated temperature reaches a preset threshold temperature and subsequently shutting off the semiconductor relays R1-R4. Alternatively, each of the semiconductor relays may include a current sensor, and the control unit 21 may estimate the temperature of each of the semiconductor relay based on a current value detected by the current sensor.

The control unit 21 integrally controls the overall distribution module 12. That is, the control unit 21 controls the operations of the semiconductor relays R1-R4 and the input/output interfaces P1-P3 corresponding to the specifications of the optional devices N1-N4 connected to the connecting terminal TB1. The control unit 21 may be provided in the form of, for example, an integrated computer composed of a central processing unit (CPU) and a storage unit, such as RAM, ROM, and hard disc.

Respective output terminals of the semiconductor relays R1-R4, respective output terminals of the input/output interfaces P1-P3 and an output terminal of the communication interface 23 are connected to the connecting terminal TB1, and also connected to the respective optional devices N1-N4 through the connecting terminal TB1 and the wire harnesses 13 illustrated in FIG. 1.

The semiconductor relay R1 is provided with a regulator (voltage converter) 24 which allows a voltage of DC 12V supplied from the battery to be converted and reduced to a voltage of DC 5V, for instance. Therefore, even when connecting with an optional device having a different drive voltage from the battery voltage, the same semiconductor relay can generate and supply a desired voltage.

Next, the operation of the electrical wiring device 1 for vehicle according to the embodiment will be described. In the embodiment, the auxiliary connector 11 illustrated in FIG. 1 is installed in a vehicle normally. That is, the vehicle is provided with the auxiliary connector 11 of simple constitution, which is connected to three wires, that is, the power supply line (+B), the ground line (GND), and the communication line. Additionally, several kinds of distribution modules 12 are prepared. In detail, there are prepared several types of distribution modules 12 corresponding to the number of semiconductor relays, the number of input/output interfaces and the presence or absence of a regulator.

Then, it is performed to select one of these distribution modules 12, which corresponds to the optional devices to be installed in the vehicle, and connect the selected module to the auxiliary connector 11. As four optional devices N1-N4 are connected in the example illustrated in FIG. 1, the distribution module 12 having devices corresponding to these optional devices N1-N4 is connected to the auxiliary connector 11.

In the control unit 21, additionally, the power supplying condition is set with respect to each of the optional devices N1-N4. For instance, the power supplying conditions at "+B", "IG (ignition)", and "ACC (accessory)" are set corresponding to the key-positions (vehicular signals) of the vehicle. In detail, there are set conditions of: "+B" where the relay is turned ON irrespective of the key-position during supply of the battery voltage; "IG" where the relay is turned ON when the vehicular ignition is turned ON; and "ACC" where the relay is turned ON when the key-position is at ACC. This setting could be executed by software in the control unit 21.

Thus, based on the control signals acquired via the communication line, the control unit 21 controls so that when the key-position is at ACC, the semiconductor relay set to the condition "ACC" is turned ON and that when the vehicular ignition is turned ON, the semiconductor relay set to the condition "IG" is turned ON when the vehicular ignition is turned ON. Note that the key-position is one example of the vehicular signals. In other cases, for instance, a door lock releasing signal or a door opening signal etc. may be used as the vehicular signals.

Additionally, a cutoff current is set with respect to each of the optional devices N1-N4. That is, as the respective optional devices N1-N4 have different rated currents and also different wire diameters for connection, the cutoff currents corresponding to the wire diameters are set. This operation can be executed by software in the control unit 21.

In the control unit 21, additionally, the supply destinations of various kinds of signals are set with respect to each of the optional devices N1-N4. In detail, if the illumination signal (ILL), the speed signal (SPD), the reverse signal (R), etc. are necessary for a certain optional device, the control unit outputs these signals to the relevant optional device N1-N4 requiring these signals through the intermediary of the input/output interfaces (Pt to P3).

Furthermore, the communication interface is connected to the optional device N1-N4 which requires the network information, such as CAN or LIN. Still further, the ground lines are connected to the respective optional devices N1-N4.

Thus, by selecting a required wire in the distribution module 12 and subsequently connecting the selected wire with the connecting terminal TB1 illustrated in FIG. 1, it becomes possible to connect with the power supply line and the signal lines required for the respective optional devices N1-N4.

In this way, in the electrical wiring device 1 for vehicle according to the embodiment, the auxiliary connector 11 connecting with only the power supply line, the ground line and the communication line is mounted on the vehicle. Then, in the event of installing the optional devices N1-N4, the distribution module 12 is disposed between the auxiliary connector 11 and the optional devices N1-N4. In the electrical wiring device 1 for vehicle according to the embodiment, therefore, since only the auxiliary connector 11 becomes an equipment to be mounted on the vehicle normally, it is possible to simplify the constitution in comparison with the conventional device extremely. Additionally, it becomes possible to perform the connecting operation with the optional devices N1-N4 easily.

In the electrical wiring device 1 for vehicle according to the embodiment, even if the optional devices N1-N4 have different wire diameters in accordance with their specifications, a fuse function is incorporated in each semiconductor relay R1-R4, provided that the semiconductor relays R1-R4 are employed for a relay inside the distribution module 12. For this reason, owing to the operation of the control unit 21 by software, it is possible to set the cutoff currents arbitrarily. According to the electrical wiring device 1 for vehicle according to the embodiment, therefore, there is no need of providing a mechanical fuse corresponding to the wire diameter, thereby allowing the constitution to be simplified.

According to the electrical wiring device 1 for vehicle according to the embodiment, since the distribution module 12 is adapted so as to acquire the signals used for the in-vehicle network communication and supply the optional devices N1-N4 with the signals, it becomes possible to supply the information required for the respective optional devices N1-N4 by simple operation.

In the electrical wiring device 1 for vehicle according to the embodiment, still further, as it would not have an influence on the communication system of the vehicle even if any communication data in a vehicle system is used in the optional devices N1-N4, it becomes possible to improve the functionality and reliability of the communication system. In the electrical wiring device 1 for vehicle according to the embodiment, additionally, as the optional devices N1-N4 may be connected to the distribution module 12 when the electrical wiring device 1 for vehicle is connected to the optional devices N1-N4, it becomes possible to improve the workability.

In the electrical wiring device 1 for vehicle according to the embodiment, additionally, as the regulator 24 is installed in the distribution module 12, it becomes possible to perform the connecting operation easily even when connecting the optional device N1-N4 requiring a power voltage (e.g. DC 5V) different from the battery voltage.

According to the electrical wiring device 1 for vehicle according to the embodiment, furthermore, several kinds of distribution modules 12 are prospectively prepared corresponding to the number of optional devices N1-N4 to be connected with the electrical wiring device 1 for vehicle and subsequently, an appropriate module is selected from several distribution modules 12 at the time of determining the specifications of the optional devices N1-N4 and successively mounted on the vehicle. Accordingly, it can be prevented that the specification of the distribution module 12 becomes excessive.

In the electrical wiring device 1 for vehicle according to the embodiment, additionally, even when it is contemplated in the future to attach an unexpected optional device, such as a drive recorder, to the electrical wiring device 1 for vehicle, it becomes possible to easily connect with such an optional device by using the distribution module 12.

Further, in the electrical wiring device 1 for vehicle according to the embodiment, as the distribution module 12 is supplied with various kinds of signals with use of the network communication, such as CAN communication and LIN communication, it becomes possible to transmit desired signals to the respective option devices N1-N4 by simple operation.

Also, as the electrical wiring device 1 for vehicle according to the embodiment does not require the operation of connecting the optional devices N1-N4 to the communication line on the side of the existing vehicular system like a conventional example, it is possible to avoid the occurrence of a trouble where the vehicular system stops due to a failure of the communication system.

Although the electrical wiring device 1 for vehicle according to the embodiment has been described with reference to the drawings, the present application is not limited to this and therefore, the constitutions of respective parts may be replaced with arbitrarily constitutions having the similar functions.

For instance, although the electrical wiring device 1 for vehicle according to the embodiment has been described with the example of the distribution module provided with four semiconductor relays, three input/output interfaces, and one communication interface on the output side, the present application is not limited to this and therefore, it is possible to set the numbers of semiconductor relays, output/input interfaces, and communication interfaces as one chooses.

What is claimed is:
1. An electrical wiring device for vehicle, comprising:
an auxiliary connector to which a power supply line, a ground line, and a communication line for an in-vehicle network all mounted on a vehicle are connected; and
a distribution module detachably connected between one or more optional devices mounted on the vehicle and the auxiliary connector, disposed between the one or more optional devices and the auxiliary connector, and connected to the power supply line, the ground line, and the communication line via the auxiliary connector, the distribution module comprising:
relays connected to the power supply line;
one or more communication interfaces;
one or more input/output interfaces configured to output first signals to the one or more optional devices;
a connecting terminal for connecting, on the optional device side of the distribution module closest to the one or more optional devices, an output of the one or more communication interfaces, outputs of the relays and outputs of the input/output interfaces to the one or more optional devices; and
a control unit configured to:
acquire second signals from the communication line via the one or more communication interfaces;
control the relays and the input/output interfaces based on the second signals acquired via the one or more communication interface interfaces; and
perform a fuse function for detecting an overcurrent in one or more of the relays on the basis of an electricity energizing current of each of the relays and an electricity energizing time of each of the relays, wherein
the control unit is configured to control operations of the relays and the input/output interfaces corresponding to the optional devices connected to the connecting terminal, and the distribution module is disposed between the auxiliary connector and the connecting terminal.

2. The electrical wiring device for vehicle of claim 1, wherein
the control unit is configured to switch ON and OFF of each of the relays corresponding to vehicular signals acquired via the communication line.

3. The electrical wiring device for vehicle of claim 1, wherein
the distribution module includes a voltage converter for converting a voltage supplied from the power supply line.

4. The electrical wiring device according to claim 1, wherein the first signals comprise one of: detection signals and control signals.

5. The electrical wiring device according to claim 1, wherein the relays comprise semiconductor relays.

6. The electrical wiring device according to claim 5, wherein in performing fuse function, the control unit performs operations for each semiconductor relay comprising:
calculating a heat generation temperature and a heat radiation temperature of the respective semiconductor relay based on a current value flowing through the respective semiconductor relay and an electricity energizing time of the respective semiconductor relay;
estimating a temperature of the respective semiconductor relay based on an ambient temperature;
detecting an overcurrent in the respective semiconductor relay if the estimated temperature reaches a preset threshold temperature; and
shutting off the respective semiconductor relay if an overcurrent is detected.

7. The electrical wiring device according to claim 6, wherein:
each of the semiconductor relays comprises a current sensor; and
in performing fuse function, the control unit performs operations for each semiconductor relay comprising estimating the temperature of the respective semiconductor relay based on a current value detected by the respective current sensor.

8. The electrical wiring device according to claim 1, wherein the control unit comprises an integrated computer comprising a central processing unit (CPU) and a storage unit.

9. The electrical wiring device according to claim 1, wherein the connecting terminal connects the outputs of the relays and the outputs of the input/output interfaces such that the second signals acquired from the communication line are output to the one or more optional devices from the distribution module as the first signals in response to a control operation from the control unit.

* * * * *